Nov. 12, 1968   I. F. LARSSON   3,410,979
METHOD AND APPARATUS FOR DRILLING HOLES BY
MEANS OF A FOCUSED LASER BEAM
Filed May 28, 1964
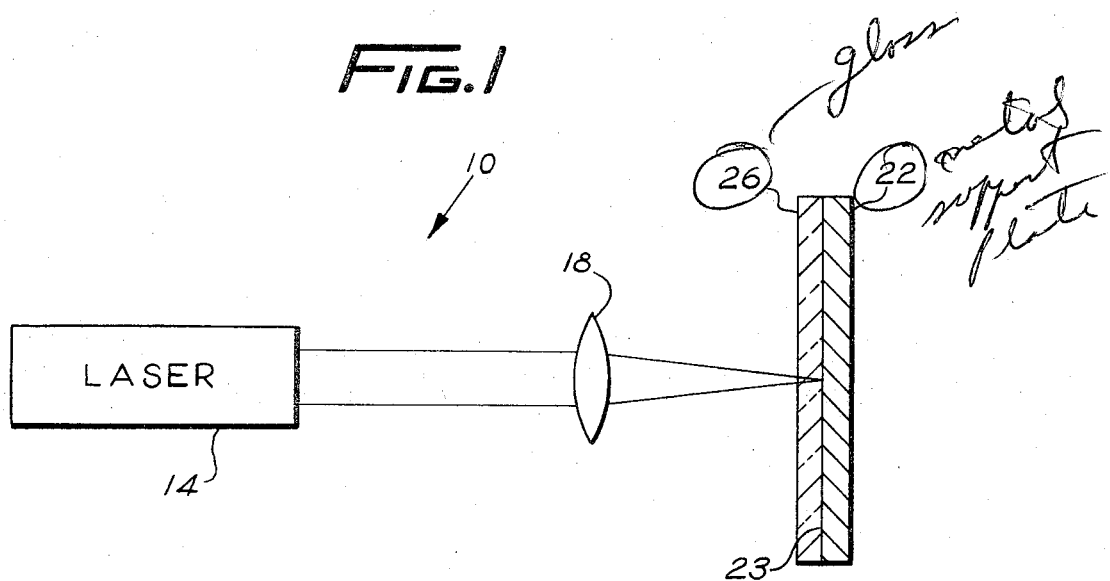
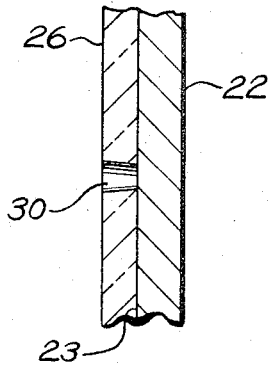
INVENTOR.
IVAR F. LARSSON
BY
Robert A. Green
ATTORNEY 3,410,979
METHOD AND APPARATUS FOR DRILLING
HOLES BY MEANS OF A FOCUSED LASER
BEAM
Ivar F. Larsson, Oakland, N.J., assignor to Burroughs
Corporation, Detroit, Mich., a corporation of Michigan
Filed May 28, 1964, Ser. No. 370,936
5 Claims. (Cl. 219—68)

ABSTRACT OF THE DISCLOSURE

The disclosure is of apparatus for generating holes including a highly absorptive support plate on which is supported a transparent workpiece in which holes are to be formed. A laser light generator is coupled with an optical system so that its light beam is focused on the surface of the support plate and thus at the interface of the workpiece and the support plate. The focused laser beam causes localized heating and vaporization of the surface of the support plate, and this forms holes in the workpiece.

---

This invention relates to the art of drilling holes and, particularly, to method and apparatus for drilling holes with a laser.

Since the invention of the laser, it has been known that the output of a laser could be focused to a small area spot of high energy which could be used to drill holes in metal support plates or substrates. This operation is achieved because the high energy of the laser beam is absorbed by the metal with resultant localized boiling and evaporation of the metal. However, up to the present time, a laser could not be used to drill holes in a substrate which was transparent to the laser beam such as a sheet of clear glass. Apparently, since it is transparent, a sheet of glass cannot absorb and convert the laser light to heat to the degree required to form a hole.

Accordingly, the objects of the invention concern the provision of improved method and apparatus including a laser for drilling holes in support plates or substrates which are transparent to laser light.

Briefly, the apparatus of the invention includes a support plate of a material such as a metal which can convert light energy to heat. The glass or other plate in which holes are to be drilled is positioned on the metal support in operative relation with a laser which is adapted to generate a sharply focused beam of light. The beam of light generated by the laser is focused on the interface of the metal plate and the glass plate, and the beam operating in conjunction with the metal plate supporting the glass plate causes holes to be drilled in the glass.

The invention is described in greater detail by reference to the drawing wherein:

FIG. 1 is a schematic representation of apparatus embodying the principles of the invention; and FIG. 2 is an enlarged sectional, elevational view of a portion of the apparatus of FIG. 1 at one stage in its processing.

Referring to the drawing, the apparatus of the invention 10 includes a source of a high energy light which may be any suitable laser apparatus 14. Such apparatus is now well know and need not be described in detail. The laser apparatus includes a suitable optical system 18 for focusing the light beam generated by the laser to a small-area beam. According to the invention, the apparatus 10 includes a thin support plate 22 of metal or the like which can absorb the light generated by the laser 14. The plate 26 to be drilled, which may be of clear glass or any other material which is substantially transparent to the laser light, is placed in contact with the surface 23 of the metal support plate 22 and facing the laser and its optical focusing apparatus 18. The glass and metal plates may be held together by clamps, by an adhesive, or by any other suitable means.

In operation of the apparatus of the invention 10, the laser light beam is focused on the surface 23 of the metal support plate 22 at the interface of the metal and glass plates and at a point where a hole is to be formed in the glass plate, and the desired hole 30 (FIG. 2) is formed by heat generated in the metal plate. The heat generated by the light beam impinging on the metal plate causes a localized boiling of the metal of the plate, and this metal is discharged through the glass plate toward the laser to form the desired hole.

In the apparatus 10, it is clear that the glass plate 26 and its metal support plate 22 may be separate structures held together in any suitable fashion. If desired, the metal plate 22 may be provided in the form of a coating of a metal such as chromium or the like, plated or evaporated or otherwise deposited directly on the glass sheet.

What is claimed is:

1. Apparatus for drilling holes in a substantially transparent plate comprising:
   a support plate of a material highly capable of absorbing light and converting the absorbed light to heat,
   said support plate having a surface which is adapted to receive and support a transparent plate in which holes are to be drilled,
   a generator of a high intensity light beam and an optical system in operative relation therewith arranged to focus the light generated by said generator on the surface of said support plate at the interface of said support plate and the transparent plate supported thereby.

2. Apparatus for drilling holes in a substantially transparent plate comprising:
   a support plate of a material highly capable of absorbing light and converting the absorbed light to heat,
   said support plate having a surface which is adapted to receive and support a transparent plate in which holes are to be drilled,
   a laser light beam generator in operative relation with said support plate, and
   optical means between the laser and said support plate for focusing the laser light beam on the surface of said support plate at the interface of said support plate and the transparent plate supported thereby.

3. The method of drilling holes in substantially transparent plates comprising the steps of:
   placing a first transparent plate to be drilled in contact with a second plate highly capable of absorbing light energy, and
   directing a high intensity light beam through an optical system and through said transparent plate onto a localized area on the surface of said second plate and vaporizing localized areas of the surface of said second plate at the region of contact with said first plate and thereby forcing the vaporized material of said second plate through said first plate to form a hole in said first plate.

4. The method of drilling holes in substantially transparent plates comprising the steps of:
   placing a first transparent plate to be drilled in contact with a second plate highly capable of absorbing light energy,
   directing a laser light beam through an optical system and through said first plate onto the surface of said second plate and thereby heating small-area portions of said second plate at the interface of said first and second plate, and
   continuing said heating until the material of said second plate at said small-area portions is vaporized and is forced through said first plate to form holes.

5. The method of drilling holes in substantially transparent plates comprising the steps of:
placing a first transparent plate to be drilled in contact with a second plate highly capable of absorbing light energy,
focusing a laser on the interface of said first and second plate and directing a high energy beam of light on a localized area of the surface of said second plate, and
causing said high energy beam of light to heat and vaporize a localized surface portion of said second plate whereby the vaporized material is forced through said first plate and forms a hole.

References Cited

UNITED STATES PATENTS

| | | | |
|---|---|---|---|
| 1,378,266 | 5/1921 | Nagel | 219—271 |
| 2,622,053 | 12/1952 | Clowe et al. | 219—347 X |
| 2,737,882 | 3/1956 | Early et al. | 83—53 X |
| 2,861,166 | 11/1958 | Cargill | 219—68 |
| 2,922,869 | 1/1960 | Giannini et al. | 219—121 |

OTHER REFERENCES

IBM Technical Disclosure Bul., vol. 5, No. 0, March 1963, p. 135.

RICHARD M. WOOD, *Primary Examiner.*

R. F. STAUBLY, *Assistant Examiner.*